(12) United States Patent
Dynkin et al.

(10) Patent No.: US 11,665,166 B2
(45) Date of Patent: May 30, 2023

(54) SECURE COMPUTING PLATFORM

(71) Applicants: Barry Ian Dynkin, Great Neck, NY (US); Benjamin Futernick Dynkin, Great Neck, NY (US); Semyon Dynkin, Great Neck, NY (US)

(72) Inventors: Barry Ian Dynkin, Great Neck, NY (US); Benjamin Futernick Dynkin, Great Neck, NY (US); Semyon Dynkin, Great Neck, NY (US)

( * ) Notice: Subject to any disclaimer, the term of this patent is extended or adjusted under 35 U.S.C. 154(b) by 386 days.

(21) Appl. No.: 16/681,802

(22) Filed: Nov. 12, 2019

(65) Prior Publication Data

US 2020/0186532 A1 Jun. 11, 2020

Related U.S. Application Data

(60) Provisional application No. 62/758,195, filed on Nov. 9, 2018.

(51) Int. Cl.
*G06F 21/53* (2013.01)
*H04L 9/40* (2022.01)
*G06F 21/62* (2013.01)
*G06F 21/74* (2013.01)

(52) U.S. Cl.
CPC ........ *H04L 63/101* (2013.01); *G06F 21/6218* (2013.01); *H04L 63/0853* (2013.01); *H04L 63/0876* (2013.01)

(58) Field of Classification Search
None
See application file for complete search history.

(56) References Cited

U.S. PATENT DOCUMENTS

| 7,392,534 | B2* | 6/2008 | Lu | H04L 63/0428 713/182 |
|---|---|---|---|---|
| 10,742,649 | B1* | 8/2020 | Hook, Jr. | H04L 63/0876 |
| 11,423,400 | B1* | 8/2022 | Hutchison | G06Q 20/40 |
| 2005/0071282 | A1* | 3/2005 | Lu | G06Q 20/3823 705/64 |
| 2009/0282359 | A1* | 11/2009 | Saul | G06F 9/452 715/784 |
| 2012/0303762 | A1* | 11/2012 | Geiser | G06F 9/4416 709/219 |
| 2013/0311990 | A1* | 11/2013 | Tang | G06F 9/45558 718/1 |
| 2014/0122875 | A1* | 5/2014 | Pizi | G06F 21/33 713/164 |
| 2016/0057123 | A1* | 2/2016 | Jiang | H04W 12/06 726/7 |
| 2016/0057135 | A1* | 2/2016 | Jiang | H04L 63/08 713/172 |

(Continued)

OTHER PUBLICATIONS

A Dynamic Network Access Control Mechanism for Virtual Desktop. Lin. IEICE. (Year: 2013).*

(Continued)

*Primary Examiner* — Venkat Perungavoor
(74) *Attorney, Agent, or Firm* — FisherBroyles, LLP; Robert Kinberg

(57) ABSTRACT

Apparatus, systems and methods for providing a limited capabilities computer which may operate on a network and be controlled, monitored and/or administered by a central network authority such as a VDI server.

19 Claims, 3 Drawing Sheets

(56) References Cited

U.S. PATENT DOCUMENTS

| | | | | |
|---|---|---|---|---|
| 2016/0112540 A1* | 4/2016 | Xia | ........................ | H04L 67/10 |
| | | | | 709/203 |
| 2016/0350018 A1* | 12/2016 | Tsirkin | .................. | G06F 3/0622 |
| 2018/0144124 A1* | 5/2018 | Lahav | ..................... | G06F 21/53 |
| 2019/0391712 A1* | 12/2019 | Singh | ..................... | H04L 67/02 |

OTHER PUBLICATIONS

Scheme of Cloud Desktop Based on Citrix. Liu. Springer. (Year: 2018).*
Case Notes: Factors Influencing the Adoption of Virtual Desktop Infrastructure (VDI) Within the South African Banking Sector. Sekwakwa. AJIC. (Year: 2015).*
Virtual Computing Laboratories Extension with Virtual Desktop Infrastructure for Smart Campus on a Cloud Computing. Song. ASTL. (Year: 2013).*
Android OS with its Architecture and Android Application with Dalvik Virtual Machine Review. Shaheen. IJMUE. (Year: 2017).*
Design and Implementation of A Network Application Architecture for Thin Clients. Kuo. IEEE. (Year: 2002).*
A Service Broker and Business Model for SaaS Applications. Moore. IEEE. (Year: 2009).*
A Remote Thin Client System for Real Time Multimedia Streaming Over VNC. Tan. IEEE. (Year: 2010).*

\* cited by examiner

SECURE COMPUTING PLATFORM

CROSS REFERENCE TO RELATED APPLICATIONS

This application claims the benefit of the filing date of U.S. provisional patent application Ser. No. 62/758,195, entitled "Secure Computing Platform," which was filed in the USPTO on Nov. 9, 2018 and which includes the same inventor. That provisional application is hereby incorporated by reference as if fully set forth herein.

FIELD OF THE TECHNOLOGY

The technology relates generally to computer security and more specifically, but not but not exclusively to a function limited computer that only performs predefined function(s), and is controlled, monitored, and administered by a central authority.

BACKGROUND OF THE TECHNOLOGY

Network and/or computer security is a problem whenever a computer is utilized over an unsecured network such as the Internet and/or when users of the computer can add and/or run unauthorized programs and/or processes and/or connect with questionable websites. It is difficult to maintain and monitor the security of such a computer and/or network.

In view of these deficiencies in traditional computer/network security, the instant disclosure identifies and addresses a need for a computer with limited capabilities. There is a need for a limited capability computer that can be controlled, monitored and/or administered by a central authority.

BRIEF SUMMARY OF THE TECHNOLOGY

Many advantages of the technology will be determined and are attained by the technology, which in a broad sense provides a computer with limited capabilities which can be controlled, monitored and/or administered by a central authority.

In one or more implementations of the technology, a minimal purpose machine for accessing a network is provided. The machine includes a graphical user interface (GUI) and a connection broker configured to connect the GUI to a remote server and receive a virtual desktop from the remote server and display the virtual desktop on the GUI. An access control module prevents unauthorized access to the network. An authentication control module prevents unauthorized access to the machine, and a kernel level process control module prevents an unauthorized process from running on the machine.

In one or more implementations of the technology, a method is provided for providing a minimal purpose machine for accessing a network. The method includes a computer logging into a virtual desktop infrastructure (VDI) server via a connection broker. The VDI server provides via the connection broker, a virtual desktop to the computer. The virtual desktop provides a preset number of functions to the computer. The VDI server connects the computer to an Internet Protocol (IP) address via a virtual private network and monitors communications between the computer and the IP address.

In one or more implementations of the technology, a non-transitory computer-readable medium is provided that may include one or more computer-executable instructions that, when executed by at least one processor of a computing device, cause the computing device to login to a virtual desktop infrastructure (VDI) server via a connection broker and receive from the VDI server, via the connection broker, a virtual desktop. The virtual desktop provides a preset number of functions to the function limited computer. The computer-executable instructions further cause the computing device to connect to an Internet Protocol (IP) address via the VDI server and a virtual private network.

Features from any of the above-mentioned embodiments and/or examples may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

For a better understanding of the technology, reference is made to the following description, taken in conjunction with the accompanying drawings, in which like reference characters refer to like parts throughout, and in which.

The technology will next be described in connection with certain illustrated embodiments and practices. However, it will be clear to those skilled in the art that various modifications, additions, and subtractions can be made without departing from the spirit or scope of the claims.

DETAILED DESCRIPTION OF THE TECHNOLOGY

Figure 1A:
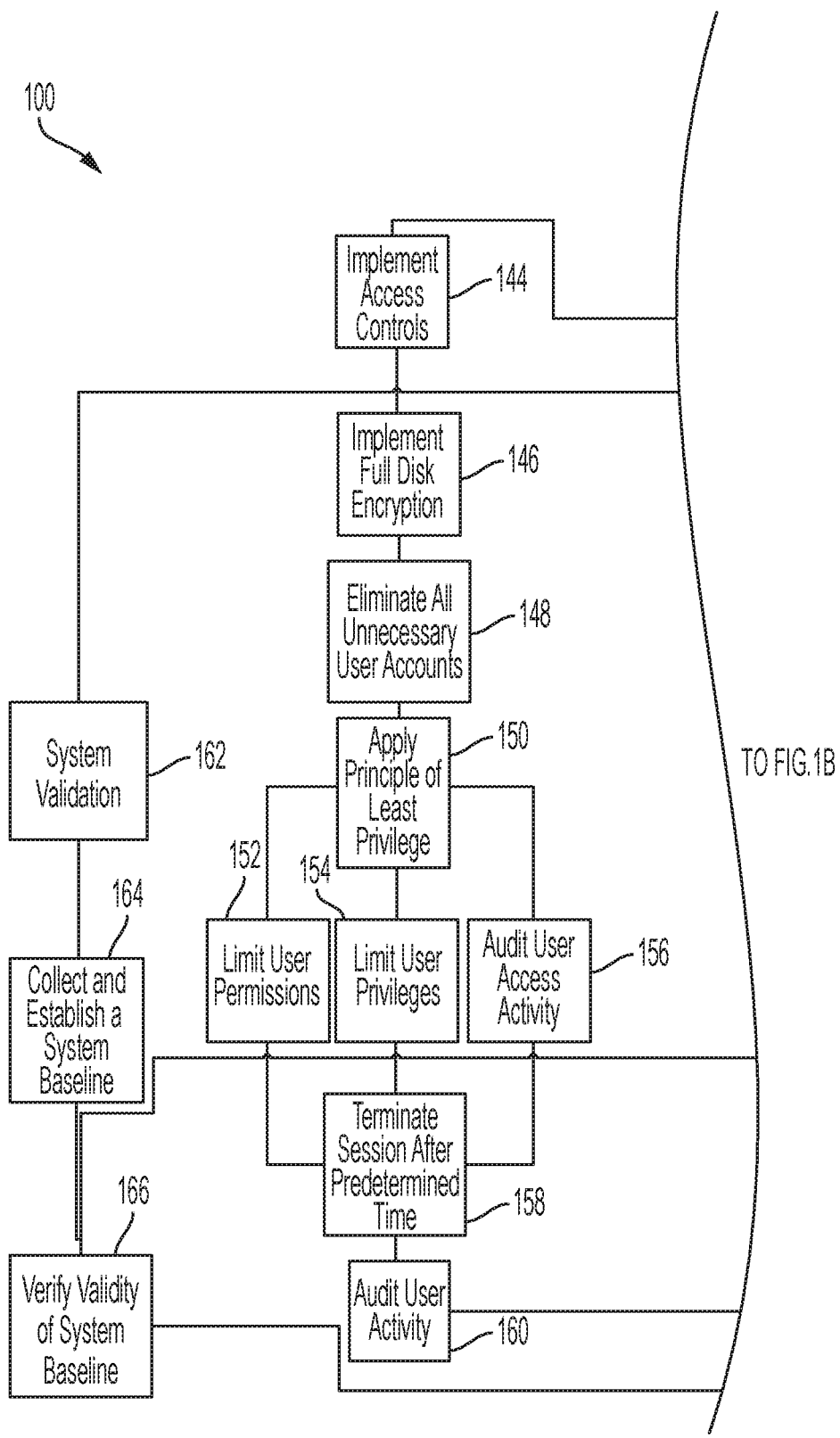
FIGS. 1A-C provide a flow chart illustrating steps performed by the system in accordance with one or more embodiments of the technology.
Figure 1B:
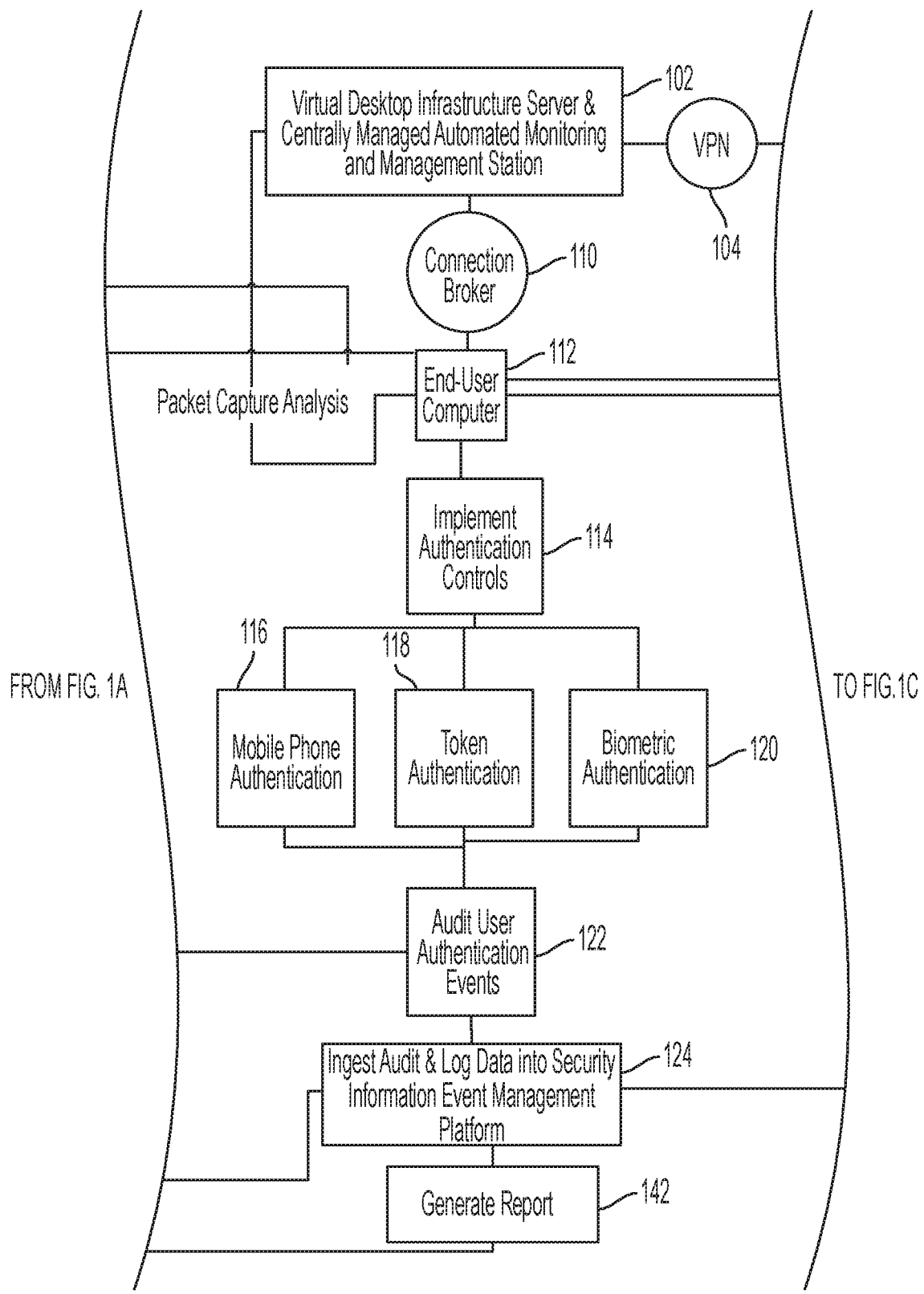
Figure 1C:
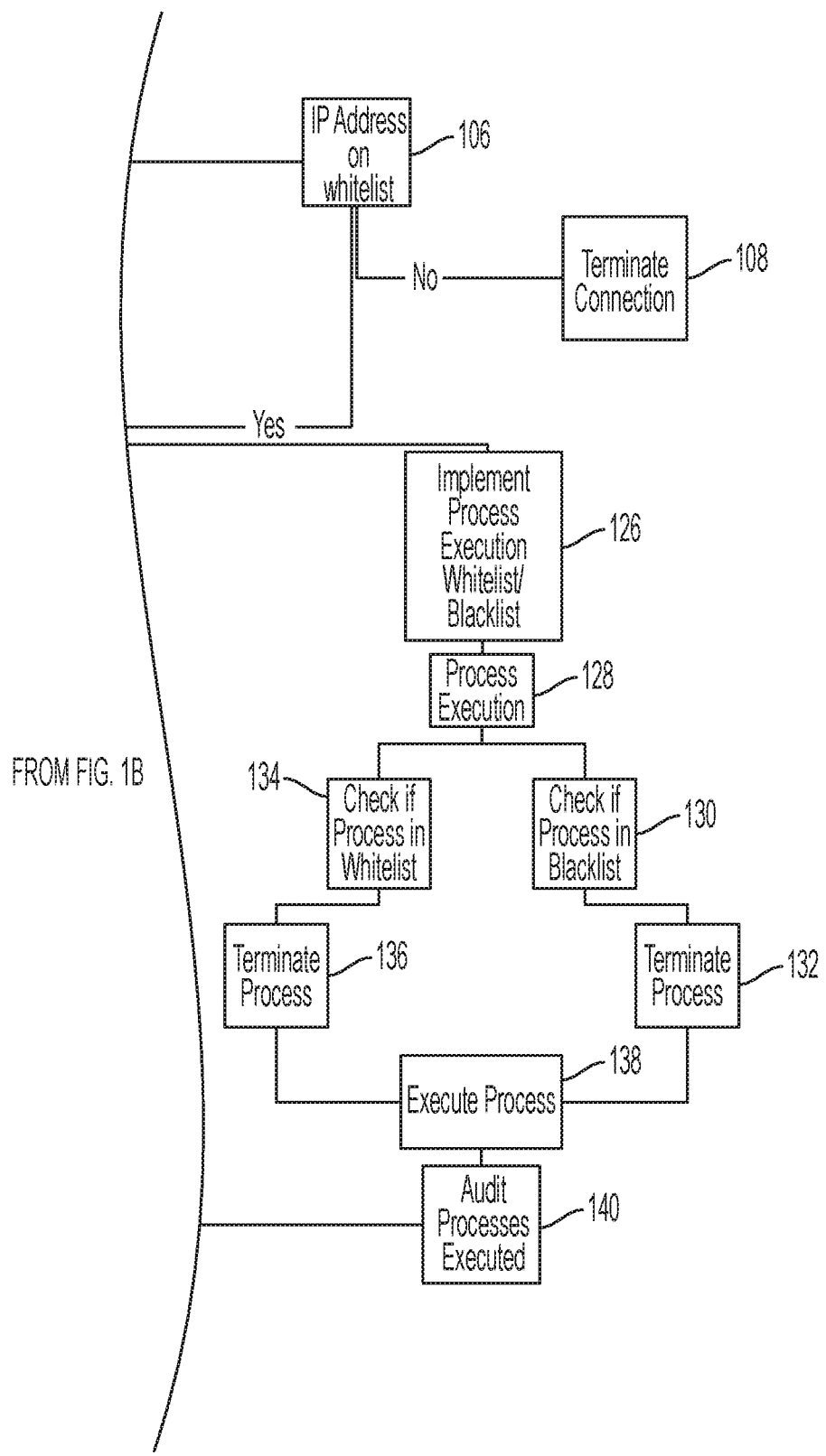

Referring to the drawings in detail wherein like reference numerals identify like elements throughout the various figures, there is illustrated in FIGS. 1A-C apparatus, systems and methods for providing a limited capabilities computer which may be controlled, monitored and/or administered by a central authority. Principles and operations of the technology may be better understood with reference to the drawings and the accompanying description.

Discussion of an embodiment, one or more embodiments, an aspect, one or more aspects, a feature, one or more features, or a configuration or one or more configurations, an instance or one or more instances is intended be inclusive of both the singular and the plural depending upon which provides the broadest scope without running afoul of the existing art and any such statement is in no way intended to be limiting in nature. Technology described in relation to one or more of these terms is not necessarily limited to use in that embodiment, aspect, feature or configuration and may be employed with other embodiments, aspects, features and/or configurations where appropriate.

For purposes of this disclosure "computer" or "device" means a mobile phone, laptop computer, tablet computer, personal digital assistant ("PDA"), desktop computer, electronic reader ("e-reader"), mobile game console, smart watch, smart glasses, voice assistant devices, or any other device which can connect to a network and transmit and receive data. It may also be used to refer to peripheral devices used with such devices.

For purposes of this disclosure "remote" means accessible via a network wherein at least two of the devices do not need to be collocated to communicate.

Without limiting the scope of the technology, FIGS. 1A-C illustrate a functional chart of a system 100 which may provide a limited capabilities computer which may be controlled, monitored and/or administered by a central authority. The technology may include the following general subcategories: Infrastructure, Secure Connectivity, Access Controls, Authentication Controls, and Kernel Level Process Controls. The subcategories may be tied together by a central authority which may implement, control, secure, audit, and/or amalgamate the information into one or more reports. The limited functionality of the system increases the security of the system by only permitting pre-approved secured processes and applications to run on the system and increases the efficacy of security monitoring and maintenance techniques and procedures through the increased transparency inherent in the limited processes of a system of limited functionality.

Infrastructure: The technology provides a Virtual Desktop Infrastructure (VDI) Server 102, Connection Broker 110, and an End-User Computer 112. VDI is an established practice in information technology and is prominently featured across many organizations. VDI infrastructure is used to deploy virtual desktops, which may be stored with the central authority or some other location that is accessible by the central authority, to an end-user's computer that has the security features discussed herein. Using a VDI system allows the central authority to return the VDI 102 to a 'clean state' at the end of an end-user's session, which mitigates the ability of a cyber actor to maintain a persistent presence on a system.

Secure Connectivity: Secure connectivity may include connecting the end-user computer to the VDI Server 102 through the connection broker 110 and connecting the end-user computer 112 to a predefined Internet Protocol (IP) address or to an IP addresses determined by the client 106. In either scenario, the connectivity may be achieved through a Virtual Private Network (VPN) 104 that tunnels all network traffic from the end-user computer 112 to a VPN server under the control of the central authority. In the case of the VDI Infrastructure, the VDI Server 102 may use the connection broker 110 to deploy a virtual desktop to the end-user computer 112. In the case of other network traffic, the VPN 104 will tunnel all outgoing and incoming web traffic through the Central Authority's VPN server. By tunneling this traffic through the VPN server, web traffic on the end-user's computer can be monitored, logged, analyzed, and aggregated into one or more reports through one or more network security tools. Additionally, this process allows the Central Authority to implement a whitelist of accepted IP Addresses with which the end-user may interact.

In one or more embodiments, web traffic going to an IP Address that is not on the whitelist may be blocked before any connections can be created 108. In one or more embodiments, an IP address that is not on the whitelist may be analyzed by the Central Authority to determine if it should be included on the whitelist (permanently or temporarily). The analysis could automatically occur, occur after requested by a user, or automatically occur after a certain number of attempts by one or more users to access that IP address. The results of the analysis may be collected by the Central Authority and reported 142 to the end-user or some other assigned recipient.

Access Controls: Access Control 144 refers to technical controls that can be implemented to prevent unauthorized individuals from accessing data and/or applications housed in a system. The technology may employ a variety of access controls to prevent unauthorized access to the system. These controls 144 may include one or more of the following:

Full Disk Encryption 146: This process uses cryptography to encrypt the entirety of the end-user's hard drive. Thus, anyone who does not have the predefined passcode/key to the system cannot access the system or any data contained in it.

Elimination of All Extraneous User Accounts 148: the technology only contains a single user account on the end-user's virtual desktop which prevents alternate avenues of ingress for illicit actors.

Limiting User Permissions 152: the single user may be provided the minimum permissions necessary to achieve the predefined function.

Limiting User Privileges 154: the user may be provided with minimum privileges 150 or a limited amount of privileges to achieve the predefined function or possibly a limited amount more.

Terminating User Sessions: after a set period of inactivity the system may terminate the user session 158. Additionally, the Central Authority may have the ability to terminate an end-user's session. In one or both of these scenarios the end-user may be provided a notification of the immanent termination and be provided with the option to continue the session. The option to continue may be as simple as a mouse click or it may require proof of identity to prevent someone other than the end-user from hijacking the computer while the end-user is away.

Auditing User and Access Activity 156: user access and general activity data may be collected, audited 160 and aggregated 124 by the Central Authority, which may then analyze the data and generate one or more reports 142. The audit may take place in real-time, and/or at scheduled times and/or after predetermined amounts of activity.

Authentication Controls 114: authentication control refers to technical controls implemented to ensure that whomever is accessing a system is authorized. A centrally managed multi-factor authentication system may be employed. A password or other access authentication protocol, with best practices for complexity being preferred but not required, may be employed and the end-user may be provided a choice as to at least one additional method for authentication. These additional methods may include, but are not limited to, mobile phone push authentication 116, emailed code authentication, token authentication 118, or biometric authentication (including, but not limited to fingerprint or facial recognition) 120. These methods will be implemented using established industry best practices preferably, but other practices may be employed. An end-user may select a computer to be pre-authenticated to a system when connecting from one or more predetermined IP Addresses thus requiring fewer forms of authentication to access the system. All authentication data may be audited 122, collected, and/or sent to the Central Authority for analysis and report generation 142. Furthermore, systems may be pre-registered with the central server to allow only certain user accounts to log-in. If any other user account attempts to log-in, access can be temporarily denied until additional steps are taken to authenticate the user or an authorized user is contacted, to ensure that only the approved users are attempting to log-in.

The system may also include continuous, periodic and/or random physical, hardware and process authentication 162. This would entail processes that authenticate all hardware on the system 166 so that no additional unregistered or unauthorized hardware is attached to the system. For example, the system could ensure that any character being inputted into the system corresponds to a physical click of that character on initial keyboard physically supplied with the system. It could also continuously ensure that no peripheral hardware devices are connected in any manner to the system's motherboard. The same may be applied to other physical input devices, such as but not limited to a mouse, biometric identification mechanism, GPS device, or any other input mechanism.

The system may also include physical location authentication using a combination of one or more geolocation processes (GPS, network-based geolocation, geo-fencing etc.) to ensure that a device attached to the system is being deployed in the physical location where it is authorized to operate.

The system may also validate hardware and software present on the physical device each time it starts up 164. If a discrepancy is detected from the registered set-up, the system may prevent boot-up, or it may require additional authentication steps for the unidentified hardware or software.

Kernel Level Process Controls: the technology may also feature kernel level process execution control which may prevent execution of a process on the kernel of the operating system which is not preapproved by the central authority. A source of security vulnerability is either the running of unsecured processes or the hijacking of secure processes to corrupt them and tamper with the results. In one or more embodiments wherein only pre-approved, secure processes run on the system and functioning of these processes is be continuously monitored, maintained, and validated, breaching the system becomes exceedingly difficult.

Execution control may be implemented using a blacklist and whitelist 126 to check all processes running on the end-user computer. In one or more embodiments, when the system wants to run a process on the kernel 128, the system may check if the process is on the blacklist 130 or whitelist 134 using unique process identifiers. In one or more embodiments, if the process is on the blacklist the Kernel may refuse to run the process 132. In one or more embodiments, if the process is on the whitelist the Kernel may execute the process 138. If the process is not found on either list, the system may be configured in different ways. In one or more embodiments the Kernel may to run the process. In one or more embodiments the Kernel may refuse to run the process 132/136. In one or more embodiments, the server may be notified and then the process may be manually authorized or rejected.

In one or more embodiments, the kernel level process control may only implement a whitelist or a blacklist. If only a whitelist is implemented, and a process is on the whitelist the process may be approved and run. If only a whitelist is implemented, and the process is not on the whitelist, then the process may be rejected, or the server may be notified and then the process may be manually authorized or rejected. If only a blacklist is implemented, and the process is on the blacklist the process may be rejected. If only a blacklist is implemented, and the process is not on the blacklist the process may be allowed, or the server may be notified and then the process may be manually authorized or rejected.

The central authority may maintain the list(s). Upon the end-user connecting to the Internet (or some other network), it may check for updates to the list(s). Additionally, in one or more embodiments, a system may only whitelist those processes necessary to achieve the single function that was predefined by or for the end-user. Finally, all kernel process information, including those processes which are terminated and those which are executed may be audited and collected for further analysis at the Central Authority.

System Validation 162: the initial state of the end-user system may be stored and protected 164. This may include all hardware, software, and drivers that are present on the system. Using cryptographic validation, the end-user system may run a self-check upon initialization to ensure there is no additional hardware, software, or driver present on the system 166. If the cryptographic validation process fails, the computer may notify the Central Authority and lock down, preventing the end-user from providing any information to a potentially compromised system, or it may require or allow further steps to authenticate and add the additional hardware, software, and/or drivers.

Central Authority Information Aggregation and Analysis 124: The Central Authority may maintain the VDI Infrastructure 102, the VPN Server, and advanced security tools necessary to maintain, monitor, and analyze the logs data which is created by the end-user system. This information may be fed into commercial advanced correlation engines which will further drill down on potential malicious cyber activity. Upon completion of the Central Authority's analysis efforts, a report may be generated 142 containing summaries of the analyzed data and conclusions drawn therein.

Having thus described at least one preferred embodiments of the technology, advantages can be appreciated. Variations from the described embodiments exist without departing from the scope of the claims. It is apparent that apparatus, systems and methods for providing a limited capabilities computer which may be controlled, monitored and/or administered by a central authority are provided. Although embodiments have been disclosed herein in detail, this has been done for purposes of illustration only, and is not intended to be limiting with respect to the scope of the claims, which follow. It is contemplated by the inventors that various substitutions, alterations, and modifications may be made without departing from the spirit and scope of the technology as defined by the claims. Other aspects, advantages, and modifications are considered within the scope of the following claims. The claims presented are representative of the technology disclosed herein. Other, unclaimed technology is also contemplated. The inventors reserve the right to pursue such technology in later claims.

Insofar as embodiments of the technology described above are implemented, at least in part, using a computer system, it will be appreciated that a computer program for implementing at least part of the described methods and/or the described systems is envisaged as an aspect of the technology. The computer system may be any suitable apparatus, system or device, electronic, optical, or a combination thereof. For example, the computer system may be a programmable data processing apparatus, a computer, a Digital Signal Processor, an optical computer or a microprocessor. The computer program may be embodied as source code and undergo compilation for implementation on a computer, or may be embodied as object code, for example.

It is also conceivable that some or all functionality ascribed to the computer program or computer system may be implemented in hardware, for example by one or more application specific integrated circuits and/or optical elements. Suitably, the computer program can be stored on a carrier medium in computer usable form, which is also envisaged as an aspect of the technology. For example, the carrier medium may be solid-state memory, optical or magneto-optical memory such as a readable and/or writable disk for example a compact disk (CD) or a digital versatile disk (DVD), or magnetic memory such as disk or tape, and the computer system can utilize the program to configure it for operation. The computer program may also be supplied from a remote source embodied in a carrier medium such as an electronic signal, including a radio frequency carrier wave or an optical carrier wave.

It is accordingly intended that all matter contained in the above description or shown in the accompanying drawings be interpreted as illustrative rather than in a limiting sense. It is also to be understood that the following claims are intended to cover all generic and specific features of the technology as described herein, and all statements of the scope of the technology which, as a matter of language, might be said to fall there between.

The invention claimed is:

1. A function limited computer for accessing a network, comprising:
    at least one memory, a processor and a graphical user interface (GUI), wherein the at least one memory and processor are configured to include:
        (a) at least one access control that prevents unauthorized access to the network;
        (b) at least one authentication control that prevents unauthorized access to the computer;
        (c) at least one kernel level process control which predefines the universe of applications and processes that can run on the function limited computer, thereby preventing an unauthorized application or process from running on the function limited computer; and
        (d) a connection broker configured to connect the GUI to a remote server and to receive a virtual desktop from the remoter server, subject to restrictions of the at least one access control, the at least one authentication control and the at least one kernel process control, and to display the virtual desktop on the GUI.

2. The function limited computer according to claim 1, further including at least one list accessed by the kernel level process control.

3. The function limited computer according to claim 2 wherein the at least one list includes a whitelist of at least one approved application or process.

4. The function limited computer according to claim 2 wherein the at least one list includes a blacklist of at least one unauthorized application or process.

5. A method for employing the function limited computer as defined in claim 1 for accessing a network, the method comprising:
    using the function limited computer for logging into a virtual desktop infrastructure (VDI) server via the connection broker;
    employing the VDI server to provide via the connection broker, the virtual desktop to the computer;
    using the virtual desktop to provide a preset number of functions to the function limited computer;
    using the VDI server to connect the computer to an Internet Protocol (IP) address via a virtual private network and monitoring communications between the computer and the IP address.

6. The method according to claim 5 wherein the monitoring the communications includes using network security tools.

7. The method according to claim 5 further comprising utilizing the VDI server for logging and analyzing the communications and generating a report based on the communications.

8. The method according to claim 5 further including utilizing the VDI server for implementing a list of accepted IP addresses with which the computer may connect.

9. The method according to claim 5 further including utilizing the VDI server for implementing a list of unauthorized IP addresses with which the computer may not connect.

10. The method according to claim 5 wherein the preset number of functions in the step of using a virtual desktop is a single function.

11. The method according to claim 5 further including utilizing the VDI server for logging the computer out of the VDI server after a predetermined period of inactivity.

12. The method according to claim 5 further including encrypting a hard drive associated with the computer.

13. The method according to claim 5 further including utilizing the VDI server for authenticating all hardware connecting to the VDI sever.

14. The method according to claim 5 further including utilizing the VDI server for authenticating all software connecting to the VDI sever.

15. A non-transitory computer-readable medium comprising one or more computer executable instructions that, when executed by the function limited computer according to claim 1, cause the limited function computer to:
    login to a virtual desktop infrastructure (VDI) server via the connection broker;
    receive from the VDI server, via the connection broker, the virtual desktop;
    utilize the virtual desktop for providing a preset number of functions to the function limited computer; and,
    connect to an Internet Protocol (IP) address via the VDI server and a virtual private network.

16. The non-transitory computer-readable according to claim 15, wherein the preset number of functions is a single function.

17. The non-transitory computer-readable medium according to claim 15, wherein the preset number of functions further cause the function limited computer not to run at least one of the applications or processes based on the at least one of the applications or processes being identified on a list of applications and processes.

18. The non-transitory computer-readable medium according to claim 15, wherein the preset number of functions cause the function limited computer to run an application or a process based on applications and processes identified on a list of applications and processes.

19. The function limited computer according to claim 1, wherein the at least one kernel level process limits a potential universe of applications and processes that can run on the function limited computer to one application and/or one process.

* * * * *